Patented June 19, 1928.

1,674,472

UNITED STATES PATENT OFFICE.

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE.

PURIFICATION OF CRUDE AROMATIC HYDROCARBONS.

No Drawing. Original application filed April 12, 1926, Serial No. 101,561. Divided and this application filed October 12, 1927. Serial No. 225,849.

This invention relates to the purification of crude aromatic hydrocarbons, and, more particularly, to the purification of light distillates from coal and oil tar and light oils condensed from coal gas.

Crude coal or oil tar distillates are usually washed with dilute acid and with alkali to remove bases and acid compounds such as phenols, followed by repeated washing with small amounts of concentrated sulfuric acid. This process is open to many objections. In the first place, while sulfuric acid removes some unsaturated compounds fairly well, many acyclic compounds such as paraffins and $CS_2$ besides other sulfur compounds, alicyclic compounds and heterocyclic compounds such as thiophenes are not removed or are only partially removed. The resulting commercial hydrocarbons such as commercial benzene, toluene, xylene, solvent naphtha, etc., are not sufficiently pure for many purposes.

It is possible to obtain highly purified hydrocarbons by the use of a sufficiently large amount of sulfuric acid and oleum but the losses of hydrocarbons are so high as to render the process commercially impracticable. A further drawback lies in the fact that the sludge which contains acid resins and other impurities is frequently considerably decomposed by the acid and is therefore of little or no value.

In my co-pending application, Serial No. 86,099, filed February 4, 1926, I have described and claimed a method of purifying crude aromatic hydrocarbons by selective halogenation whereby the impurities are changed into compounds having boiling points for the most part considerably above that of aromatic hydrocarbons and in the case of carbon disulfide into carbon tetrachloride which is harmless for most purposes owing to its great chemical inertness. I have also described the use of various halogen carriers, such as iodine, bromine, sulfur compounds, metal chlorides, compounds of antimony and the like. In this application, I have further described the production of sludges which consist in large part of halogen bodies and can be used as a raw material for obtaining solvents and other useful bodies, whereas sludges produced by sulfuric acid are for the most part worthless.

The present invention consists in a combination of the features of selective halogenation and acid washing at least a portion of the two treatments taking place simultaneously either by simultaneous treating with a halogenating agent and strong sulfuric acid or by treatment with a reagent as chlorsulfonic acid which acts both as a chlorinating agent and a sulfuric acid wash. Obviously, of course the combined treatment may be preceded or followed by treatment either with sulfuric acid alone or a halogenating agent alone.

As described in my prior application above referred to I have found that while chlorine and bromine are active and can be used for the selective halogenation step in the present invention iodine is not active. Therefore, throughout the present specification and claims it should be understood that the expression "active halogen" excludes iodine, which for the purpose of this invention is not to be considered as an active halogen.

The combination of halogenation and sulfuric acid washing in a single step produces a result which is greater than the sum of the results achieved by the two processes separately since sulfuric acid is a halogenation catalysis and therefore enhances the efficiency of the halogenation process.

A preliminary treatment with sulfuric acid alone is sometimes desirable, particularly in the case of heavier distillates such as solvent naphtha and the like which distillates contain not only resin forming bodies like cumaron and indene but also other unsaturated alifatic compounds which are non-resin forming and which are easily attacked by sulfuric acid. These products are removed by the acid wash and the following combined halogenating and sulfuric acid washing process removes the last traces of alifatic compounds or undesirable alicyclic compounds such as cyclopentadiene and dicyclopentadiene. Heterocyclic compounds such as thiophenes are also removed together with styrol and to a certain extent hydrindene which are transformed into high boiling halogenated products. The combination of halogenation and sulfuric acid wash permits a milder treatment which sufficiently removes undesirable impurities without effecting serious polymerization of the cumarons and indenes present. The solvent naphtha or heavy solvent fractions may be removed by distillation and can then be subjected to conditions which favor polymerization and result in transforming the resinophores into high grade resins of very light color and desirable physical qualities. The aromatic hydrocarbons can be distilled off and are obtained in a high state of purity. The yields of both resins and aromatic hydrocarbons are very high.

The combined treatment with halogenating agents and sulfuric acid removes impurities which are attacked by either of the two reagents in a most satisfactory manner and transforms them into harmless products. In this manner, light oil fractions can be purified by removing alifatic hydrocarbons such as pentane, hexane, amylene, hexylene, heptylene, octylene, alicyclic compounds such as cyclopentadiene, dicyclopentadiene, and tetrahydrobenzene, hydrindene and the like, heterocyclic compounds such as pyrrol, pyridine, thiophene, thiotolene, thioxene, and the like. Other sulfur compounds particularly carbon disulfide which may be present in the crude fractions are attacked by halogen and are transformed into other compounds such as carbon tetrachloride in the case of carbon disulfide. The presence of carbon tetrachloride in armoatic hydrocarbons is practically harmless as this compound is so indifferent that it does not interfere with the use of the hydrocarbons in catalytic processes particularly reductions and hydrogenations. The aromatic hydrocarbons produced by the present process are thus practically free from sulfur and are in a state of high purity.

Various chlorinating or brominating agents may be used such as elementary chlorine or bromine, either gaseous, or solutions or bodies yielding chlorine and bromine, particularly with sulfuric acid, such as aqua regia, phosgene, sulfuryl chloride, nitrosyl chlordie, hypochlorites, hypobromites, chlorides or hydrochloric acid in the presence of oxidizers and the like.

Liquid chlorine is particularly effective where the amount of impurities is large as the evaporation of the liquid absorbs large quantities of heat and prevents local rise of temperature due to the reaction of the chlorine with the impurities which reactions are for the most part exothermic. A local rise in temperature is undesirable in many cases particularly where it is desired to prevent the chlorination of side chains as side chain chlorination is accelerated by a rise in temperature.

Mixtures of the above chlorinating agents with or without elementary chlorine may also be used in the presence or absence of chlorine carriers and mixtures of chlorinating and brominating agents may also be used.

Chlorsulfonic acid is a particularly effective agent for the combined acid wash and halogenation as it includes in its composition both of the agents. It may be used alone or in combination with other halogenating agents with or without free sulfuric acid.

Sulfur or sulfur compounds such as sulfur halides, sulfuryl chloride, thionylchloride benzene sulfochloride and homologues, are preferably used singly or together as halogen carriers as they preferentially catalyze the halogenation and particularly the chlorination of acyclic, alicyclic and heterocyclic compounds while having but little effect on the halogenation of aromatic hydrocarbons. Nitrosylchloride may also be used.

The following halogen carriers may also be used singly or together; iron, ferric chloride or bromide, aluminum, aluminum halides, halides of antimony, tin, gold, tellurium, zirconium, uranium, vanadium, bismuth, molybdenum, zinc, copper, and nickel, animal charcoal, wood charcoal or any other well known halogen carriers. The reaction may also be advantageously carried out in the presence of light, heat or silent electric discharge. Combinations of the chemical mixtures enumerated above and the physical catalysts such as light, heat and the like may be used.

The chlorination of carbon disulfide is particularly accelerated by iodine, bromine, metallic chlorides, aluminum chlorides, aluminum turnings, ferric chloride, iron scale, iron sesquioxide, iron sulfide, ferrous carbonate, ferrous sulfate and antimony, either in the form of a powdered metal, oxide or chloride. Chemical compounds of the catalysts which preferentially catalize the halogenation of the several classes of impurities may also be used.

The carriers may be added before or during halogenation or may be formed in halogenation. For example, hypochlorites may be decomposed with $SO_2$ forming sulfurylchloride which acts as chlorinating agent and carrier at the same time. Other combinations are also possible.

Unremoved sulfuric acid and hydrochloric acid formed during chlorination may be neutralized by adding suitable substances before, during or after chlorination. Examples of neutralizing substances are soda ash, caustic alkalies, lime, slaked and unslaked, calcium carbonate, magnesia, ammonia and similar substances. The combined halogenation and sulfuric acid wash may take place in the presence of steam or water which tends to dilute the chlorine or other halogenating agent used and also strongly tends to prevent undesired condensation or polymerization which might otherwise take place in the presence of the sulfuric acid used. The steam may be wet or superheated and may in some cases be used as a heating means to bring the reaction to the desired temperature. Steam and chlorine may be introduced simultaneously or separately. In all cases, however, vigorous agitation is desired in order to produce the reagents required.

The invention will be described in greater detail in connection with the following specific examples.

*Example 1.*

Light oil is treated with caustic soda to remove phenols, fractionated and a crude benzene fraction coming over up to 105° C. is taken. The fraction is then treated with 1 to 2% of 60° Bé. sulfuric acid, which is added gradually with vigorous agitation. After about 25 minutes, agitation is stopped and the acid is allowed to settle for about 30 minutes and then drawn off. This acid, known as pyridine acid removes most of the pyridine. The mixture is permitted to stand for another 20 to 30 minutes and a further acid settling out is removed.

The product is then treated with chlorosulphonic acid at room temperature, the amount being sufficient to react with the impurities but not exceeding an amount corresponding to 6–8% by weight of chlorine.

Vigorous agitation should take place during the addition. After reaction is complete the mixture is washed with water and then with an alkali solution, dried and the benzol distilled off. A single column distillation is usually sufficient, and the benzene hydrocarbons produced are of high chemical purity and contain only small amounts of carbon tetrachloride.

*Example 2.*

A crude benzene fraction boiling up to 105° C. is freed from phenols and bases in the usual manner by means of alkali and sulfuric acid. The product is then treated with 0.2 to 0.9% by volume of 65–66° Bé. sulfuric acid with vigorous agitation and at the same time 2.5–3.5% of gaseous chlorine diluted with air is introduced. The oil darkens and the process is kept up until a distilled sample gives entirely negative results in the sulfuric acid test.

The acid is permitted to settle out and the hydrocarbon mixture is neutralized and distilled.

The toluene is much purer than the commercial toluene and is well suited for use in catalytic reductions. If desired the process can be carried out in the presence of chlorine carriers, such as various sulphur compounds.

*Example 3.*

A crude solvent naphtha fraction distilled from light oil and boiling between 140 and 160° C. is freed from phenols and bases and about 0.3 to 0.6% of a 65—66° Bé. sulfuric acid is added with vigorous agitation in a thin stream and liquid chlorine is sprayed under the surface, the addition amounting to 4 to 5% by weight. The temperature is preferably maintained below 30° C. The acid is drawn off, the product washed with water in the usual way and the solvent naphtha is poured off, yielding a colorless oil. The cumarone and indene may then be polymerized with strong sulfuric acid and the aromatic hydrocarbons distilled off with or without steam. The aromatic hydrocarbons, as well as the solvent naphtha, are excellent solvents and are free from sulfur compounds or from compounds which would result in darkening on long exposure to light.

In the claim, the expression, "coal tar distillate" is used to cover not only true distillates from coal tar, but also mixtures of similar chemical composition containing aromatic hydrocarbons and acyclic, alicyclic and heterocyclic impurities such as condensates from coal gas, benzol plan residues and the like.

This application is a division of my co-pending application, Serial No. 101,561, filed April 12, 1926.

What is claimed as new is:

1. A method of producing purified aromatic hydrocarbons, which comprises subjecting an aromatic hydrocarbon mixture containing acyclic, alicyclic and heterocyclic impurities to the combined action of a halogenating agent and strong sulfuric acid, the amount of the latter being insufficient to produce a commercial product of the usual purity and the amount of active halogen being sufficient to react with substantially all of the impurities but insufficient to effect substantial nuclear halogenation.

2. The method according to claim 1 in which the combined halogen and sulfuric acid step takes place in the presence of a halogen carrier other than sulfuric acid.

3. A method according to claim 1 in which the halogenation and wash takes place in the presence of chlorsulfonic acid.

4. A method according to claim 1 in which polymerization is resisted during the combined halogenation and sulfuric acid step by carrying out the step in the presence of steam.

Signed at Pittsburgh, Pennsylvania, this 7th day of October, 1927.

ALPHONS O. JAEGER.